(12) United States Patent
Dinescu et al.

(10) Patent No.: US 8,455,578 B2
(45) Date of Patent: Jun. 4, 2013

(54) INK-RECEPTIVE COATING COMPOSITION

(75) Inventors: Liviu Dinescu, Chatsworth, CA (US);
Dong-Tsai Hseih, Arcadia, CA (US);
Ming Kun Shi, Arcadia, CA (US);
Ekaterina Vaskova, Woodside, CA (US); Zhisong Huang, San Dimas, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 11/998,914

(22) Filed: Dec. 3, 2007

(65) Prior Publication Data

US 2008/0188599 A1    Aug. 7, 2008

Related U.S. Application Data

(60) Provisional application No. 60/872,086, filed on Dec. 1, 2006.

(51) Int. Cl.
*C08K 5/435*      (2006.01)
*C08L 77/00*      (2006.01)

(52) U.S. Cl.
USPC .................................. 524/169; 524/168

(58) Field of Classification Search
USPC .................................. 524/169, 168
See application file for complete search history.

(56) References Cited

U.S. PATENT DOCUMENTS

| | | | |
|---|---|---|---|
| 2,757,156 A | 7/1956 | Dazzi | |
| 3,156,665 A | 11/1964 | Brossman et al. | |
| 3,751,257 A | 8/1973 | Dahlman | |
| 4,503,118 A | 3/1985 | Murakami et al. | |
| 5,242,739 A | 9/1993 | Kronzer et al. | |
| 5,271,990 A | 12/1993 | Kronzer et al. | |
| 5,464,502 A * | 11/1995 | Pease | 162/60 |
| 5,501,902 A | 3/1996 | Kronzer | |
| 5,660,622 A | 8/1997 | Nikoloff | |
| 5,781,216 A | 7/1998 | Haruta et al. | |
| 5,798,179 A | 8/1998 | Kronzer | |
| 5,827,627 A | 10/1998 | Cleckner et al. | |
| 5,853,899 A | 12/1998 | Anderson et al. | |
| 5,925,712 A | 7/1999 | Kronzer | |
| 5,962,149 A | 10/1999 | Kronzer | |
| 6,033,739 A | 3/2000 | Kronzer | |
| 6,113,725 A | 9/2000 | Kronzer | |
| 6,139,672 A | 10/2000 | Sato et al. | |
| 6,139,939 A | 10/2000 | Haruta et al. | |
| 6,153,288 A | 11/2000 | Shih et al. | |
| 6,177,187 B1 * | 1/2001 | Niemoller et al. | 428/32.12 |
| 6,200,668 B1 | 3/2001 | Kronzer | |
| 6,450,633 B1 | 9/2002 | Kronzer | |
| 6,623,841 B1 | 9/2003 | Venkatasanthanam et al. | |
| 6,753,379 B1 | 6/2004 | Kawate et al. | |
| 6,780,924 B2 | 8/2004 | Shih et al. | |
| 6,866,383 B2 | 3/2005 | Naik et al. | |
| 6,916,515 B1 | 7/2005 | Almog et al. | |
| 7,087,274 B2 | 8/2006 | Xu et al. | |
| 2005/0084287 A1 * | 4/2005 | Niimi et al. | 399/111 |
| 2005/0209102 A1 * | 9/2005 | Sasaki et al. | 503/200 |
| 2006/0045998 A1 | 3/2006 | Kitamura et al. | |

FOREIGN PATENT DOCUMENTS

| | | | |
|---|---|---|---|
| EP | 0 933 226 A2 | | 8/1999 |
| EP | 1 505 099 A2 | | 2/2005 |
| JP | 09-059898 | * | 8/1995 |
| JP | 2001-071695 | * | 3/2001 |
| WO | WO 97/18090 A1 | | 5/1997 |
| WO | WO 03/016045 A1 | | 2/2003 |

OTHER PUBLICATIONS

Machine translation of JP 09-059898.*
Machine translation of JP 2001-071692.*
Wacker Polymers Vinnapas. No date.*
Office Action dated Nov. 3, 2009, from European Patent Application No. 07 853 218.1.
International Search Report dated Apr. 14, 2008 for PCT Appl. No. PCT/US2007/024751.
Response dated Apr. 26, 2010 to Office Action dated Nov. 3, 2009 in European Patent Application No. 07 853 218.1.
Office Action dated Nov. 9, 2010 in European Patent Appln. No. 07 853 218.1.
Notice of Abandonment dated Jun. 29, 2011 in European Patent Appln. No. 07 853 218.1.
International Preliminary Report on Patentability mailed Jun. 3, 2009, in corresponding PCT Application No. PCT/US2007/024751.
Written Opinion mailed Jun. 1, 2009, in corresponding PCT Application No. PCT/US2007/024751.
Communication pursuant to Rules 161 and 162 EPC mailed Jul. 21, 2009, in corresponding European Patent Application No. 07853218.1.
Amended claims and description filed Jul. 1, 2009, in corresponding European Patent Application No. 07853218.1.

* cited by examiner

*Primary Examiner* — John Uselding
(74) *Attorney, Agent, or Firm* — Kriegsman & Kriegsman

(57) ABSTRACT

An ink-receptive coating composition. In a preferred embodiment, the composition includes (a) a polyamide, the polyamide comprising an aliphatic polyamide in particulate form, the aliphatic polyamide having a softening point in the temperature range of about 50-250° C. and an average particle size of about 1 to 80 microns; (b) a plasticizer, the plasticizer being a solid plasticizer selected from the group consisting of alkyl sulfonamides and aromatic sulfonamides, the solid plasticizer having a melting point in the range of about 50-200° C.; (c) a binder, the binder being a thermoplastic polymer delivered as a water-based emulsion or solution, the binder having a $T_g$ in the range of about −20-120° C.; (d) a dye-retention agent, the dye-retention agent comprising at least one cationic polymer; (e) an ink viscosity-modifying agent; and (f) a dispersant, the dispersant being selected from the group of cationic and non-ionic dispersants. The composition may be used to form, for example, an ink-receptive coating as part of an ink-jet recording sheet or a heat-transfer sheet.

28 Claims, No Drawings

INK-RECEPTIVE COATING COMPOSITION

CROSS-REFERENCE TO RELATED APPLICATIONS

The present application claims the benefit under 35 U.S.C. 119(e) of U.S. Provisional Patent Application Ser. No. 60/872,086, filed Dec. 1, 2006, the disclosure of which is incorporated herein by reference.

BACKGROUND OF THE INVENTION

The present invention relates generally to ink-receptive coating compositions and relates more particularly to a novel ink-receptive coating composition.

With the advent of computers, it has become easy to customize the layout of text, graphics and other information. A common device for printing such information from a computer is an ink-jet printer. Ink-jet printers typically utilize an aqueous-based ink in which colorants are delivered, together with a water-based vehicle, to an imaging substrate. The imaging substrate usually includes a carrier and an ink-receptive coating positioned over the carrier. To ensure good image quality, the ink-receptive coating should absorb rapidly the liquid component of the ink and at the same time immobilize the ink dye on the coating surface.

Various types of imaging substrates that are suitable for use with ink-jet printers currently exist. One such type of imaging substrate is referred to in the art as "an ink-jet recording sheet" and comprises an ink-receptive coating that is fixed relative to its carrier. Such ink-jet recording sheets are typically used to record printed information on the carrier in a durable fashion and may be used, for example, to generate printed documents or photographs. Alternatively, by applying an adhesive to the carrier of such a sheet opposite to its ink-receptive coating, such an ink-jet recording sheet may be used to make a customizable label. Another type of imaging substrate is referred to in the art as "a heat-transfer sheet" and comprises an ink-receptive coating that is removably secured to its carrier. In use, information is printed onto the ink-receptive coating of a heat-transfer sheet, and the ink-receptive coating is then transferred, typically under conditions of heat and pressure, from the carrier to a secondary substrate, such as a T-shirt.

In commonly-assigned U.S. Pat. No. 6,866,383, inventors Naik et al., which issued Mar. 15, 2005, and which is incorporated herein by reference, there is disclosed an ink-receptive coating composition that includes (a) a filler; (b) a binder having a $T_g$ of less than 30° C.; and (c) a cationic polymer, wherein the composition, when coated on a substrate, forms an ink-receptive coating which accepts ink loading greater than about 300%. The coating compositions provide a printable surface receptive to high loading of ink-jet inks which do not crack at loading in excess of 300%, and in one embodiment, do not crack at loading up to about 400%. In addition, the print shows superior liquid resistance and the print quality of the inks is improved and a reduction in bleeding of colors occurs. Also, printed articles have outdoor durability especially those with overlaminates.

In commonly-assigned U.S. Pat. No. 6,780,924, inventors Shih et al., which issued Aug. 24, 2004, and which is incorporated herein by reference, there is disclosed an ink-receptive composition that contains a binder, a particulate filler, and a mordant. A preferred binder comprises one or more acrylic copolymers made with at least one wet abrasion resistance-enhancing monomer.

In commonly-assigned U.S. Pat. No. 6,623,841, inventors Venkatasanthanam et al., which issued Sep. 23, 2003, and which is incorporated herein by reference, there is disclosed an ink-receptive composition that is formed from a melt processable blend of a water-soluble polymer and a substantially water-insoluble polymer, and provides an inherently ink receptive surface without further surface treatment. The ink receptive blend comprises in the range of from 20 to 80 percent by weight water-soluble polymer, and in the range of from 20 to 80 percent by weight substantially water-insoluble polymer based on the total weight of the blend. The blend has a melting temperature in the range of from about 100 to 600° F. Preferred water-soluble polymers include polyvinyl alcohols and polyalkyl oxazolines.

In commonly-assigned U.S. Pat. No. 6,153,288, inventors Shih et al., which issued Nov. 28, 2000, and which is incorporated herein by reference, there is disclosed an ink-receptive composition that contains a pigment dispersed in a binder composed of an ethylene vinyl acetate emulsion polymer and at least one water soluble, cationic polymer, such as polydiallyldimethylammonium chloride and copolymers of a quaternary amino acrylate or methacrylate and a hydroxy-lower alkyl acrylate or methacrylate.

SUMMARY OF THE INVENTION

The present invention is directed at a novel ink-receptive coating composition.

According to one aspect of the invention, there is provided an ink-receptive coating composition, the ink-receptive coating comprising (a) a polyamide, the polyamide being in particulate form; (b) a plasticizer, the plasticizer being capable of hydrogen-bonding to the polyamide; and (c) a binder.

According to another aspect of the invention, there is provided an ink-receptive coating composition, the ink-receptive coating composition comprising (a) a polyamide, the polyamide comprising an aliphatic polyamide in particulate form, the aliphatic polyamide having a softening point in the temperature range of about 50-250° C. and an average particle size of about 1 to 80 microns; (b) a plasticizer, the plasticizer being a solid plasticizer selected from the group consisting of alkyl sulfonamides and aromatic sulfonamides, the solid plasticizer having a melting point in the range of about 50-200° C.; (c) a binder, the binder being a thermoplastic polymer delivered as a water-based emulsion or solution, the binder having a $T_g$ in the range of about −20-120° C.; (d) a dye-retention agent, the dye-retention agent comprising at least one cationic polymer; (e) an ink viscosity-modifying agent; and (f) a dispersant, the dispersant being selected from the group of cationic and non-ionic dispersants.

According to yet another aspect of the invention, there is provided an ink-receptive coating composition, the ink-receptive coating composition comprising (a) at least one polyamide in particulate form, the at least one polyamide comprising at least one copolymer of epsilon caprolactam and 12-aminododecanolactam, 6/12 polyamide or Nylon 6/12 having a softening point in the temperature range of about 100-150° C. and an average particle size of about 10 to 20 microns; (b) a solid plasticizer, the solid plasticizer comprising a mixture of o-toluenesulfonamide and p-toluenesulfonamide, wherein the at least one polyamide and the solid plasticizer are present in a weight ratio of plasticizer to polyamide of about 40-50 parts plasticizer:100 parts polyamide; (c) a binder, the binder comprising an emulsion of an ethylene-vinyl acetate polymer stabilized by non-ionic stabilizer, wherein the binder is present in a weight ratio, by solids, of about 10 to 20 parts binder:100 parts polyamide; (d) a dye-retention agent, the dye-retention agent comprising an ethylene acrylic acid derivative formulated in an emulsion, wherein the dye-retention agent is present in a weight ratio, by solids, of about 1 to 20 parts dye-retention agent:100 parts polyamide; (e) an ink viscosity-modifying agent, the ink viscosity-modifying agent comprising a polyethylene glycol polymer having a molecular weight of about 100,000 to 2,000,000 daltons, wherein the ink-viscosity modifying agent is present in a weight ratio, by solids, of about 0.1 to 20 parts ink-viscosity modifying agent:100 parts polyamide; and (f) a dispersant, the dispersant selected from the group consisting of tallow trimethylammonium chloride; alkyl sulfo-betaines; alkyl polyethoxylates; and polyethoxylated alkyl phenols.

The present invention is also directed to an ink-receptive coating obtained using the present ink-receptive coating composition.

Additional features, advantages and aspects of the present invention and its embodiments are set forth in part in the description which follows, and in part will be obvious from the description or may be learned by practice of the invention. In the description, there are shown by way of illustration specific embodiments for practicing the invention. These embodiments will be described in sufficient detail to enable those skilled in the art to practice the invention, and it is to be understood that other embodiments may be utilized and that changes may be made without departing from the scope of the invention. The following detailed description is, therefore, not to be taken in a limiting sense, and the scope of the present invention is best defined by the appended claims.

DETAILED DESCRIPTION OF PREFERRED EMBODIMENTS

The present invention relates to an ink-receptive coating composition that comprises (a) a polyamide in particulate form; (b) a plasticizer; and (c) a binder. The composition is preferably applied to a substrate to form an ink-receptive coating having a dry coat weight of about 1 g/m² to 100 g/m², preferably about 30 g/m², and a thickness of about 40 to 50 microns.

The polyamide particles of the present ink-receptive coating composition may comprise either a single polyamide species or a mixture of polyamide species. Preferably, the polyamide particles are aliphatic polyamides, either crystalline or not, having a softening point in the temperature range of about 50-250° C., more preferably about 70-180° C., and even more preferably about 100-150° C. For example, the polyamide particles may comprise one or more nylon 6, 6-12, and 12-polyamides and/or one or more aliphatic polyamides derived from the reaction of one or more fatty acids with one or more aliphatic diamines. The polyamide particles preferably have a diameter of about 1 to 80 microns, more preferably about 5 to 30 microns, and even more preferably about 10 to 20 microns, and preferably have a specific surface area in the range of about 1-200 m²/g, more preferably about 2-100 m²/g, and even more preferably about 6-20 m²/g. In addition, the polyamide particles preferably have an elevated storage modulus when measured in a molten state for temperatures in the range of 120-200° C. Thus, the resin is preferred to have a storage modulus (G') of at least $2 \times 10^4$ dyn/cm² when measured for the molten state at a temperature of less than 200° C. (Storage modulus (G') is an indirect physical representation of the molecular weight and, hence, the polymer strength at an elevated temperature.)

Examples of suitable polyamides include Orgasol® 3502 polyamide (Arkema Chemicals, Inc., Philadelphia, Pa.), Orgasol® 3501 polyamide, and GRILTEX® EMS polyamides (EMS-Chemie, Inc., Sumter, S.C.). Orgasol® 3502 polyamide is a 6/12 polyamide powder having an average particle size of 20±3 microns, a melting point of 142° C., a density of 1.07 g/cm³, an apparent density of 0.375 g/cm³, a tensile strength at break of 44 Mpa, an elongation at break of 370%, a specific surface area of 6 m²/g, and a pH of greater than 4. Orgasol® 3501 polyamide (Arkema Chemicals, Inc., Philadelphia, Pa.) is a 6/12 polyamide powder having an average particle size of 10±3 microns, a melting point of 142° C., a density of 1.07 g/cm³, an apparent density of 0.265 g/cm³, a specific surface area of 20 m²/g, and a pH of greater than 4.

Between Orgasol® 3501 and Orgasol® 3502, Orgasol® 3502 is preferred because Orgasol® 3502 has more strength when subjected to an elevated temperature. However, it may be desirable to blend a small amount of Orgasol® 3501 together with Orgasol® 3502 because Orgasol® 3501 has a higher specific surface area than Orgasol® 3502 (20 m²/g vs. 6 m²/g, respectively), which higher specific surface area may lead to an improvement in ink absorptivity and, therefore, to an improvement in print quality. Preferably, the weight ratios of Orgasol® 3502 to Orgasol® 3501 range from about 70:30, respectively, to 100:0, respectively. More preferably, the weight ratio of Orgasol® 3502 to Orgasol® 3501 is about 93:7, respectively.

The plasticizer of the present composition, which may comprise either a single plasticizer species or a mixture of plasticizer species, may comprise either small organic molecules or oligomeric polymers that are capable of interacting with the polyamide particles via hydrogen bonding when blended in melt. The effect of the plasticizer is to reduce the melting or softening point of the polyamide resin while improving properties, such as stretchability and flexibility. Preferably, the plasticizer is not water soluble or is only partially water soluble (e.g., <15 g/L) at room temperature. In addition, the plasticizer preferably is a solid and melts in the range of about 50-200° C., more preferably about 70-120° C., and even more preferably about 90-100° C.

The plasticizer of the present composition may be an N-alkyl substituted or unsubstituted alkyl sulfonamide or aryl sulfonamide. For example, the plasticizer may be selected from the group of N-alkyl benzenesulfonamides, N-hydroxyalkyl-alkyl benzenesulfonamides, N-alkyl-o-alkyl benzenesulfonamides, N-alkyl-p-alkyl benzenesulfonamides, alkyl benzenesulfonamides, and alkyl benzenesulfonamide formaldehyde resins or similar plasticizers of the type disclosed in U.S. Pat. No. 2,757,156, inventor Dazzi, which issued Jul. 31, 1956, and U.S. Pat. No. 3,156,665, inventor Brossman et al., which issued Nov. 10, 1964, both of which are incorporated herein by reference. Specific examples of suitable plasticizers include, but are not limited to, N-butylbenzene sulfonamide (BBSA); p-toluene sulfonamide (PTSA); a mixture of o-toluenesulfonamide and p-toluenesulfonamide (O/PTSA); N-(2-hydroxypropyl)benzene sulfonamide (HPBSA); a mixture of N-ethyl o- and p-toluene sulfonamide (N-E-O/PTSA); N-ethyl-p-toluene sulfonamide (N-E-PTSA); N-methyl-p-toluene sulfonamide (MTSA); N-butyl-p-toluene sulfonamide (BTSA); N-cyclohexyl-p-toluene sulfonamide (CTSA); p-(p-toluenesulfonyl amido)diphenylamine (Naugard SA); p-toluenesulfonamide-formaldehyde resin (MHP); a mixture of o- and p-toluenesulfonamide formaldehyde resin (MH); toluenesulfonamide-formaldehyde resin solution of butyl acetate (MS-80); N-(2-hydroxypropyl)-4-toluenesulfonamide (DW); N-methylbenzene sulfonamide (MBSA); N-ethylbenzene sulfonamide (EBSA); benzene sulfonamide; substituted benzene sulfonamide (SBSA); benzenesulfonbutylamide (Plastol BSA); benzenesulfonmethylamide (BM-4); n-tallow-4-toluene sulfonamide (TTSA); N,N-bis-(2-hydroxyethyl)-p-toluenesulfonamide; and N-(2-hydroxyethyl)-p-toluenesulfonamide.

Preferably, the plasticizer is present in the coating composition in a weight ratio of plasticizer to polyamide resin of about 20-80 parts plasticizer:100 parts polyamide resin, more preferably about 30-60 parts plasticizer:100 parts polyamide resin, and even more preferably about 40-50 parts plasticizer:100 parts polyamide resin.

The binder of the present composition binds together the polyamide particles and the plasticizer and is preferably compatible in melt phase with the polyamide particles and the plasticizer. Preferably, the binder is a thermoplastic polymer that is delivered as a water-based emulsion or solution and may include any one or more of the following polymeric materials: poly (vinyl acetate) polymers, ethylene-vinyl acetate copolymers, ethylene-acrylic acid copolymers, polyacrylates, polyamides, polyesters, polyurethanes, or the like. The $T_g$ of the binder is preferably in the range of about −20-120° C., more preferably about 0-80° C., and even more preferably about 10-70° C. If, as discussed further below, the coating composition includes a dye-retention agent in the form of a quaternary polymer, then binder emulsions that are stabilized by cationic or non-ionic mechanisms are preferred. Examples of such binder materials include poly (vinyl alcohol) stabilized emulsions of ethylene-vinyl acetate polymers, such as AIRFLEX 124, 125 and 144 emulsions (Air Products & Chemicals, Inc., Allentown, Pa.), cationic polyurethanes, such as Witcobond® W-213 polyurethane (Chemtura Corporation, Middlebury, Conn.), and cationic polyamides, such as AMRES 8855, 8870, C12, C20, C25, PR-335CU, PR-247HV polyamide (Georgia Pacific Resins, Inc., Crosett, Ark.).

Preferably, the binder is present in the coating composition in a weight ratio (by solids) of about 5 to 50 parts binder:100 parts polyamide resin, more preferably from about 10 to 20 parts binder:100 parts polyamide resin.

The ink-receptive coating composition of the present invention preferably also comprises one or more dye-retention agents. The one or more dye-retention agents serve to hold acid dye colorants in water-based inks that are printed onto the ink-receptive coating, thereby diminishing dye diffusion. In one embodiment, the one or more dye-retention agents comprise one or more cationic polymers. The one or more cationic polymers may be water-soluble or may be water-insoluble and formulated as a dispersion or emulsion. Such cationic polymers include, but are not limited to, amide-epichlorohydrin polymers, polyacrylamides with cationic moieties, polyethylimines, polydiallylamines, and the like. Specific examples of water-soluble polymers include poly (diallyldimethylammonium chloride), poly(2-hydroxy-3-methacryloxypropyl trimethylammonium chloride), and poly (butylacrylate-methacryloxyethyl trimethylammonium bromide). Specific examples of water-insoluble polymers include quaternary acrylic copolymers like SYNTRAN Hx31-65 trimethyl aminoethyl methacrylate/methyl methacrylate (Interpolymer Corp., Canton, Mass.) and SYNTRAN Hx31-44 1-methoxy-2-propanol acrylate copolymer (Interpolymer Corp.); cationic modified ethylene-acrylic acid emulsions, such as Michem® Emulsion 09625 (Michelman, Inc., Cincinnati, Ohio); cationic polyethylene emulsions, such as Michem® 9730 (Michelman, Inc.); and cationic shell styrenelacrylate copolymer composition latexes, such as Basoplast® 265D (BASF Corporation, Charlotte, N.C.).

Preferably, the one or more dye-retention agents are present in the coating composition in a total weight ratio (by solids) of about 1 to 20 parts dye-retention agent(s):100 parts polyamide resin.

The ink-receptive coating composition of the present invention preferably also comprises one or more ink-viscosity modifying agents. The one or more ink-viscosity modifying agents of the present invention serve to modify the viscosity of ink that is printed onto the coating and may include, for example, a polyethylene glycol polymer having an average molecular weight ranging from about 100,000 to 2,000,000 daltons, preferably about 100,000 to 600,000 daltons. Examples of suitable ink-viscosity modifying agents include POLYOX N-10, N-80, N-750 and N-205 poly(ethylene oxides) (Dow Chemical Company, Midland, Mich.).

Preferably, the one or more ink-viscosity modifying agents are present in the coating composition in a total weight ratio (by solids) of about 0.1 to 20 parts ink-viscosity modifying agent(s):100 parts polyamide resin.

The ink-receptive coating composition of the present invention preferably also comprises one or more dispersants or surfactants (the terms "dispersant" and "surfactant" being used interchangeably in the present specification and claims). The one or more dispersants serve to disperse and to stabilize the polyamide resin and the plasticizer in dispersion. Preferably, the dispersant is non-ionic or cationic, particularly in those cases in which the dye-retention agent is cationic. Examples of cationic dispersants include tallow trimethylammonium chloride, alkyl sulfo-betaines, and the like. Examples of non-ionic dispersants include alkyl polyethoxylates, such as Tergitol 15-S-20, 15-S-30 and 15-S-40 surfactants (Dow Chemical Company, Midland, Mich.); and polyethoxylated alkyl phenols, such as TRITON X-45 and TRITON X-100 octylphenol ethoxylates (Dow Chemical Company, Midland, Mich.). Other suitable dispersants include polymeric carboxylates, such as Solsperse 27000 dispersant (The Lubrizol Corporation, Wilmington, Del.).

The ink-receptive coating composition of the present invention preferably also comprises a quantity of water. If desired, a co-solvent may also be present. Such co-solvents include, but are not limited to, alcohols, glycols (e.g., ethylene glycol, propylene glycol, diethylene glycol) and/or other polar solvents that are miscible in water.

The ink-receptive coating composition of the present invention may additionally include other additives to obtain one or more desired characteristics, such additives including, but not being limited to, defoamers, anti-oxidants, UV stabilizers, cross-linkers, and waxes.

To prepare the ink-receptive coating composition of the present invention, one preferably adds each component, in the following sequence, to a suitably-sized container: water and any co-solvents, dispersant(s), polyamide resin(s), plasticizer(s), binder(s), dye-retention agent(s), viscosity-modifying agent(s), and any other additives. Next, the aforementioned components are mixed. This may be effected, for example, using a 1200-lb capacity container equipped with a 14" Cowl blade. The blade may be operated at 75-100 rpm to generate adequate shear to obtain good mixing but not high enough for foaming to occur. A small amount of isopropyl alcohol (up to about 0.8 wt % of the total composition) may be added to effectively degas the compounded materials.

Thus prepared, the composition of the present invention may be used to form an ink-receptive coating on a desired carrier. This may be done, for example, first by pouring the composition into a coating pan or by pumping the composition from a container into the coating pan. If pumped from a container into the coating pan, a circulation system may be applied to ensure that the materials in the coating pan and in the container are properly circulated. A Meyer rod of a certain groove depth characterized by a designated number (e.g., #40-42 double wound rod) may be used to meter the coating picked up on the web and transferred from an applicator. The coated product may then be fed through a dryer. After drying, the coated product may be subjected to steam treatment, slitting and converting.

The following examples are provided for illustrative purposes only and are in no way intended to limit the scope of the present invention:

Example 1

Formulation of Ink-Receptive Coating Composition

An ink-receptive coating composition was prepared as follows:

| Component | Parts by weight |
| --- | --- |
| De-ionized water | 25.0 |
| Tergitol 15-S-40 (10%) surfactant | 9.5 |
| Orgasol ® 3502 polyamide resin | 15.0 |
| Ketjenflex 9S o/p toluene sulfonamide plasticizer mixture (Axcentive SARL, France) | 7.0 |
| AIRFLEX 144 ethylene vinyl acetate emulsion (55%) | 3.3 |
| Michem ® 9625 cationic modified ethylene-acrylic acid emulsion (25%) | 6.5 |
| PolyOx N80 (10%) polyethyelene oxide | 12.0 |

Example 2

Preparation of Sulfonamide Plasticizer Dispersion in Water

Ketjenflex 9S or n-methyl-p-toluene-sulfonamide (NMTS) was placed into a ceramic mill with mill balls (0.5" size cylinders) and left overnight to mill in the presence of water and a dispersant. The composition used for milling consisted of 120 g of $H_2O$, 45.6 g of Tergitol 15-S-40 (10%) and 33.6 g of Ketjenflex 9S, and the milling time was 24 hours.

Example 3

Preparation of Sulfonamide Plasticizer Dispersion in Water

Ketjenflex MH, a solid plasticizer consisting of a toluene-sulfonamide-formaldehyde condensation product (Axcentive SARL, France), was placed into a ceramic mill with mill balls (0.5" size cylinders) and left overnight to mill in the presence of water and a dispersant. The composition used for milling consisted of 120 g of $H_2O$, 45.6 g of Tergitol 15-S-40 (10%) and 33.6 g of Ketjenflex MH, and the milling time was 24 hours.

Example 4

Formulation and Use of Ink-Receptive Coating Composition

An ink-receptive coating composition was formulated as follows:

| Component | Parts by weight |
| --- | --- |
| 20% ethanolic solution of N-methyl-p-toluene-sulfonamide plasticizer | 35.0 |
| Tergitol 15-S-40 (10%) surfactant | 9.5 |
| Orgasol ® 3502 polyamide resin | 15.0 |
| AIRFLEX 144 ethylene vinyl acetate emulsion (55%) | 3.3 |
| Michem ® 9625 cationic modified ethylene-acrylic acid emulsion (25%) | 6.5 |
| PolyOx N80 (10%) polyethyelene oxide | 6.0 |

The above-described composition was coated at 150μ wet onto an adhesive layer of a heat-transfer sheet and then dried at 70° C. for 5 minutes. The printing quality of this ink-receptive coating using an HP 7350 printer looked good, the ink drying time was within seconds, but the black ink showed some feathering.

Example 5

Formulation and Use of Ink-Receptive Coating Composition

An ink-receptive coating composition was formulated as follows:

| Component | Parts by weight |
| --- | --- |
| De-ionized water | 25.0 |
| N-methyl-p-toluene-sulfonamide plasticizer | 7.0 |
| Tergitol 15-S-40 (10%) surfactant | 9.5 |
| Orgasol ® 3502 polyamide resin | 15.0 |
| AIRFLEX 144 ethylene vinyl acetate emulsion (55%) | 3.3 |
| Michem ® 9625 cationic modified ethylene-acrylic acid emulsion (25%) | 6.5 |
| PolyOx N80 (10%) polyethyelene oxide | 6.0 |

The above-described composition included a dispersion of crystalline NMTS. Because of the relatively large plasticizer particles, some solid settling was noticed when the solution was stored for some hours. This composition was coated at 150μ wet onto an adhesive layer of a heat-transfer sheet and then dried at 70° C. for 5 minutes. The printing quality of this ink-receptive coating using an HP 7350 printer was poor, the ink drying time was slow, and the black ink feathering artifacts were severe.

Example 6

Formulation and Use of Ink-Receptive Coating Composition

An ink-receptive coating composition was formulated as follows:

| Component | Parts by weight |
| --- | --- |
| 20% ethanolic solution of N-methyl-p-toluene-sulfonamide plasticizer | 35.0 |
| Tergitol 15-S-40 (10%) surfactant | 9.5 |
| Orgasol ® 3502 polyamide resin | 15.0 |
| AIRFLEX 144 ethylene vinyl acetate emulsion (55%) | 3.3 |
| Michem ® 9625 cationic modified ethylene-acrylic acid emulsion (25%) | 6.5 |
| PolyOx N80 (10%) polyethyelene oxide | 12.0 |

The above-described composition included an increased amount of polyethylene oxide to improve the print quality. The composition was coated at 150μ wet onto an adhesive layer of a heat-transfer sheet and then dried at 70° C. for 5 minutes. The printing quality of this ink-receptive coating using an HP 7350 printer was inferior to that obtained in Example 4.

Example 7

Formulation and Use of Ink-Receptive Coating Composition

An ink-receptive coating composition was formulated as follows:

| Component | Parts by weight |
|---|---|
| De-ionized water | 25.0 |
| Ketjenflex 9S o/p toluene sulfonamide plasticizer mixture | 7.0 |
| Tergitol 15-S-40 (10%) surfactant | 9.5 |
| Orgasol ® 3502 polyamide resin | 15.0 |
| AIRFLEX 144 ethylene vinyl acetate emulsion (55%) | 3.3 |
| Michem ® 9625 cationic modified ethylene-acrylic acid emulsion (25%) | 6.5 |
| PolyOx N80 (10%) polyethyelene oxide | 6.0 |

The above-described composition included Ketjenflex 9S plasticizer in an un-milled state. This composition was coated at 150μ wet onto an adhesive layer of a heat-transfer sheet and then dried at 70° C. for 5 minutes. The printing quality of this ink-receptive coating using an HP 7350 printer was poor, the ink drying time was slow, and the black ink feathering artifacts were severe.

Example 8

Formulation and Use of Ink-Receptive Coating Composition

An ink-receptive coating composition was formulated as follows:

| Component | Parts by weight |
|---|---|
| De-ionized water | 25.0 |
| Ketjenflex 9S o/p toluene sulfonamide plasticizer mixture | 7.0 |
| Tergitol 15-S-40 (10%) surfactant | 9.5 |
| Orgasol ® 3502 polyamide resin | 15.0 |
| AIRFLEX 144 ethylene vinyl acetate emulsion (55%) | 3.3 |
| Michem ® 9625 cationic modified ethylene-acrylic acid emulsion (25%) | 6.5 |
| PolyOx N80 (10%) polyethyelene oxide | 20.0 |

The above-described composition included Ketjenflex 9S plasticizer that was milled in water/Tergitol solution as described above in Example 2. This composition was coated at 150μ wet onto an adhesive layer of a heat-transfer sheet and then dried at 70° C. for 5 minutes. The printing quality of this ink-receptive coating using an HP 7350 printer was good, the ink drying time was quick (within seconds), and the black ink showed some minor feathering.

Example 9

Formulation and Use of Ink-Receptive Coating Composition

An ink-receptive coating composition was formulated as follows:

| Component | Parts by weight |
|---|---|
| De-ionized water | 30.0 |
| Ketjenflex 9S o/p toluene sulfonamide plasticizer mixture | 7.0 |
| Tergitol 15-S-40 (10%) surfactant | 9.5 |
| Orgasol ® 3502 polyamide resin | 18.0 |
| AIRFLEX 144 ethylene vinyl acetate emulsion (55%) | 4.0 |
| Michem ® 9625 cationic modified ethylene-acrylic acid emulsion (25%) | 7.8 |
| PolyOx N80 (10%) polyethyelene oxide | 14.4 |

The above-described composition included Ketjenflex 9S plasticizer that was milled in water/Tergitol solution as described above in Example 2. This composition differed from that of Example 8 in that all of the components were increased by about 20%, except for the Tergitol solution and the Ketjenflex 9S plasticizer, which were kept constant, and the PolyOx N80 polyethylene oxide, which was decreased. This composition was coated at 150μ wet onto an adhesive layer of a heat-transfer sheet and then dried at 70° C. for 5 minutes. The printing quality of this ink-receptive coating using an HP 7350 printer was good, the ink drying time was quick (within seconds), and the black ink showed some minor feathering.

Example 10

Formulation and Use of Ink-Receptive Coating Composition

An ink-receptive coating composition was formulated as follows:

| Component | Parts by weight |
|---|---|
| De-ionized water | 30.0 |
| Ketjenflex 9S o/p toluene sulfonamide plasticizer mixture | 7.0 |
| Tergitol 15-S-40 (10%) surfactant | 9.5 |
| Orgasol ® 3502 polyamide resin | 18.0 |
| AIRFLEX 144 ethylene vinyl acetate emulsion (55%) | 4.0 |
| Michem ® 9625 cationic modified ethylene-acrylic acid emulsion (25%) | 6.5 |
| PolyOx N80 (10%) polyethyelene oxide | 14.4 |

This composition was identical to that of Example 9, except that the amount of Michem® 9625 cationic polymeric emulsion was decreased and the milling time used to prepare the plasticizer dispersion was increased to 48 hours. This composition was coated at 150μ wet onto an adhesive layer of a heat-transfer sheet and then dried at 70° C. for 5 minutes. The printing quality of this ink-receptive coating using an HP 7350 printer was good, the ink drying time was quick (within seconds), and the black ink showed some minor feathering.

Example 11

Formulation and Use of Ink-Receptive Coating Composition

An ink-receptive coating composition was formulated as follows:

| Component | Parts by weight |
|---|---|
| De-ionized water | 25.0 |
| Ketjenflex 9S o/p toluene sulfonamide plasticizer mixture | 7.0 |

-continued

| Component | Parts by weight |
|---|---|
| Tergitol 15-S-40 (10%) surfactant | 9.5 |
| Orgasol ® 3502 polyamide resin | 15.0 |
| AIRFLEX 144 ethylene vinyl acetate emulsion (55%) | 3.3 |
| Michem ® 9625 cationic modified ethylene-acrylic acid emulsion (25%) | 5.0 |
| PolyOx N80 (10%) polyethyelene oxide | 12.0 |

This composition was similar to that of Example 10, except that the amounts of all of the components, except for the Tergitol 15-S-40 surfactant, were decreased. This composition was coated at 150μ wet onto an adhesive layer of a heat-transfer sheet and then dried at 70° C. for 5 minutes. The printing quality of this ink-receptive coating using an HP 7350 printer was good, the ink drying time was quick (within seconds), and the black ink showed some minor feathering.

Example 12

Formulation and Use of Ink-Receptive Coating Composition

An ink-receptive coating composition was formulated as follows:

| Component | Parts by weight |
|---|---|
| De-ionized water | 25.0 |
| Ketjenflex 9S o/p toluene sulfonamide plasticizer mixture | 7.0 |
| Tergitol 15-S-40 (10%) surfactant | 9.5 |
| Orgasol ® 3502 polyamide resin | 15.0 |
| AIRFLEX 144 ethylene vinyl acetate emulsion (55%) | 3.3 |
| Michem ® 9625 cationic modified ethylene-acrylic acid emulsion (25%) | 5.0 |
| PolyOx N80 (10%) polyethyelene oxide | 12.0 |

This composition was similar to that of Example 11, except that the plasticizer was milled dry using 1" ceramic cylinders for about 24 hours. This composition was coated at 150μ wet onto an adhesive layer of a heat-transfer sheet and then dried at 70° C. for 5 minutes. The printing quality of this ink-receptive coating using an HP 7350 printer was good, the ink drying time was quick (within seconds), and the black ink showed some minor feathering.

Example 13

Formulation and Use of Ink-Receptive Coating Composition

An ink-receptive coating composition was formulated as follows:

| Component | Parts by weight |
|---|---|
| De-ionized water | 25.0 |
| Ketjenflex MH plasticizer | 7.0 |
| Tergitol 15-S-40 (10%) surfactant | 9.5 |
| Orgasol ® 3502 polyamide resin | 15.0 |
| AIRFLEX 144 ethylene vinyl acetate emulsion (55%) | 3.3 |
| Michem ® 9625 cationic moldified ethylene-acrylic acid emulsion (25%) | 5.0 |
| PolyOx N80 (10%) polyethyelene oxide | 12.0 |

This composition was similar to that of Example 12, except that a Ketjenflex MH plasticizer dispersion was used, the Ketjenflex MH plasticizer dispersion being prepared as in Example 3 but with milling for about 19 hours. This composition was coated at 150μ wet onto an adhesive layer of a heat-transfer sheet and then dried at 70° C. for 5 minutes. The printing quality of this ink-receptive coating using an HP 7350 printer was good, the ink drying time was quick (within seconds), and the black ink showed less feathering than with the samples obtained using Ketjenflex 9S.

Example 14

Formulation and Use of Ink-Receptive Coating Composition

An ink-receptive coating composition was formulated as follows:

| Component | Parts by weight |
|---|---|
| De-ionized water | 25.0 |
| Ketjenflex MH plasticizer | 5.0 |
| Tergitol 15-S-40 (10%) surfactant | 9.5 |
| Orgasol ® 3502 polyamide resin | 15.0 |
| AIRFLEX 144 ethylene vinyl acetate emulsion (55%) | 3.3 |
| Michem ® 9625 cationic modified ethylene-acrylic acid emulsion (25%) | 5.0 |
| PolyOx N80 (10%) polyethyelene oxide | 12.0 |

This composition was similar to that of Example 13, except that the amount of the Ketjenflex MH plasticizer dispersion was decreased in an effort to minimize further ink feathering. This composition was coated at 150μ wet onto an adhesive layer of a heat-transfer sheet and then dried at 70° C. for 5 minutes. The printing quality of this ink-receptive coating using an HP 7350 printer was good, the ink drying time was quick (within seconds), and the black ink showed less feathering than with the sample of Example 13.

Example 15

Formulation and Use of Ink-Receptive Coating Composition

An ink-receptive coating composition was formulated as follows:

| Component | Parts by weight |
|---|---|
| De-ionized water | 25.0 |
| Ketjenflex 9S o/p toluene sulfonamide plasticizer mixture | 7.0 |
| Tergitol 15-S-40 (10%) surfactant | 9.5 |
| Orgasol ® 3502 polyamide resin | 15.0 |
| AIRFLEX 144 ethylene vinyl acetate emulsion (55%) | 3.3 |
| Michem ® 9625 cationic modified ethylene-acrylic acid emulsion (25%) | 6.5 |
| PolyOx N80 (10%) polyethyelene oxide | 12.0 |

This composition was similar to that of Example 12, except that the amount of Michem® 9625 cationic emulsified ethylene-acrylic acid was increased to make the color wash resistant. The composition was processed as in Example 12, and the resulting heat-transfer sheet was used to transfer the printing to an article of clothing, which was then washed and dried a number of times. The color loss during washing/drying cycles was visible improved, as compared to a similar sample obtained using Example 12.

Example 16

Formulation and Use of Ink-Receptive Coating Composition

An ink-receptive coating composition was formulated as follows:

| Component | Parts by weight |
|---|---|
| De-ionized water | 25.0 |
| Plastol 2158 plasticizer | 3.5 |
| Ketjenflex 9S o/p toluene sulfonamide plasticizer mixture | 3.5 |
| Tergitol 15-S-40 (10%) surfactant | 9.5 |
| Orgasol ® 3502 polyamide resin | 15.0 |
| AIRFLEX 144 ethylene vinyl acetate emulsion (55%) | 3.3 |
| Michem ® 9625 cationic modified ethylene-acrylic acid emulsion (25%) | 6.5 |
| PolyOx N80 (10%) polyethyelene oxide | 12.0 |

This composition was similar to that of Example 15, except that half the amount of solid plasticizer was replaced with the liquid plasticizer, Plastol 2158. The composition was processed as in Example 15. The coated samples had a greasy feel and poor ink absorptive features similar to coatings based only on liquid plasticizers.

Example 17

Formulation and Use of Ink-Receptive Coating Composition

An ink-receptive coating composition was formulated as follows:

| Component | Parts by weight |
|---|---|
| De-ionized water | 39.0 |
| Ketjenflex 9S o/p toluene sulfonamide plasticizer mixture | 7.0 |
| Tergitol 15-S-40 (33%) surfactant | 2.9 |
| Orgasol ® 3502 polyamide resin | 15.0 |
| AIRFLEX 144 ethylene vinyl acetate emulsion (55%) | 3.3 |
| Michem ® 9625 cationic modified ethylene-acrylic acid emulsion (25%) | 6.5 |
| PolyOx N80 (10%) polyethyelene oxide | 12.0 |

This composition was similar to that of Example 12, the principal differences being that, in this composition, (i) a more concentrated solution of Tergitol 15-S-40 was used and (ii) dry micronized Ketjenflex 9S having an average particle size of 10μ was used. While showing a relatively good print quality when freshly coated, ink receptive coatings of this formulation showed considerable degradation in print quality when aged for 24 hours in an oven heated to 60° C. The print quality degradation consisted of severe black ink feathering when printed with an HP 7350 printer. The image quality degraded even further when sheet samples were subjected to heating at 50° C. and 50% RH in an environmental chamber of a 24 hour period.

Example 18

Formulation and Use of Ink-Receptive Coating Composition

An ink-receptive coating composition was formulated as follows:

| Component | Parts by weight |
|---|---|
| De-ionized water | 39.0 |
| Ketjenflex 9S o/p toluene sulfonamide plasticizer mixture | 7.0 |
| Tergitol 15-S-40 (33%) surfactant | 1.0 |
| Orgasol ® 3502 polyamide resin | 15.0 |
| AIRFLEX 144 ethylene vinyl acetate emulsion (55%) | 3.3 |
| Michem ® 9625 cationic modified ethylene-acrylic acid emulsion (25%) | 6.5 |
| PolyOx N80 (10%) polyethyelene oxide | 12.0 |

This composition was similar to that of Example 17, except that the amount of Tergitol 15-S-40 surfactant was reduced by two-thirds in this composition. While the image quality and the black ink feathering improved upon aging at 50° C. in 50% RH, a small amount of ink feathering was still noticeable, especially when aged samples were printed using HP ink-jet printers.

Example 19

Formulation and Use of Ink-Receptive Coating Composition

An ink-receptive coating composition was formulated as follows:

| Component | Parts by weight |
|---|---|
| De-ionized water | 39.0 |
| Ketjenflex 9S o/p toluene sulfonamide plasticizer mixture | 7.0 |
| Tergitol 15-S-40 (33%) surfactant | 1.0 |
| Orgasol ® 3502 polyamide resin | 15.0 |
| AIRFLEX 144 ethylene vinyl acetate emulsion (55%) | 3.3 |
| Michem ® 9625 cationic modified ethylene-acrylic acid emulsion (25%) | 6.5 |
| PolyOx N80 (10%) polyethyelene oxide | 6.0 |

This composition was similar to that of Example 18, except that the amount of polyethylene glycol was reduced by one-half in this composition. The ink-receptive coating of this formulation showed no image degradation, even after aging at 50° C. in 50% RH.

Example 20

Formulation and Use of Ink-Receptive Coating Composition

An ink-receptive coating composition was formulated as follows:

| Component | Parts by weight |
|---|---|
| De-ionized water | 39.0 |
| Ketjenflex 9S o/p toluene sulfonamide plasticizer mixture | 7.0 |
| Tergitol 15-S-40 (33%) surfactant | 1.0 |

-continued

| Component | Parts by weight |
|---|---|
| Orgasol ® 3502 polyamide resin | 14.0 |
| Orgasol ® 3501 polyamide resin | 1.0 |
| AIRFLEX 144 ethylene vinyl acetate emulsion (55%) | 3.3 |
| Michem ® 9625 cationic modified ethylene-acrylic acid emulsion (25%) | 6.5 |
| PolyOx N80 (10%) polyethyelene oxide | 6.0 |

This composition was similar to that of Example 19, except that a small amount (7%) of Orgasol® 3502 was replaced with the smaller particle size Orgasol® 3501 to improve image resolution when printed by ink-jet printers. This formulation also showed no aging effects when the print quality was tested after sheet samples were subjected to aging conditions of the type described above.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. An ink-receptive coating composition comprising:
   (a) a polyamide, the polyamide being in particulate form;
   (b) a plasticizer, the plasticizer being capable of hydrogen-bonding to the polyamide, the plasticizer being a solid plasticizer;
   (c) a binder, the binder comprising a non-ionic stabilized emulsion of an ethylene-vinyl acetate polymer;
   (d) a dye-retention agent, the dye retention agent comprising at least one cationic polymer, wherein the cationic polymer is present as part of an ethylene acrylic acid cationic emulsion; and
   (e) a quantity of a water-based solvent, wherein the polyamide, the plasticizer and the binder are all present in the quantity of the water-based solvent.

2. The ink-receptive coating composition as claimed in claim 1 wherein the polyamide consists of a single polyamide species.

3. The ink-receptive coating composition as claimed in claim 1 wherein the polyamide comprises an aliphatic polyamide.

4. The ink-receptive coating composition as claimed in claim 3 wherein the aliphatic polyamide has a softening point in the temperature range of about 50-250° C.

5. The ink-receptive coating composition as claimed in claim 3 wherein the aliphatic polyamide comprises a polyamide selected from the group consisting of nylon 6, 6-12, and 12.

6. The ink-receptive coating composition as claimed in claim 5 wherein the aliphatic polyamide comprises nylon 6-12.

7. The ink-receptive coating composition as claimed in claim 1 wherein the polyamide has an average particle size of about 1 to 80 microns.

8. The ink-receptive coating composition as claimed in claim 1 wherein the plasticizer consists of a single plasticizer species.

9. The ink-receptive coating composition as claimed in claim 1 wherein the plasticizer comprises a plurality of plasticizer species.

10. The ink-receptive coating composition as claimed in claim 1 wherein the solid plasticizer has a melting point in the range of about 50-200° C.

11. The ink-receptive coating composition as claimed in claim 1 wherein the plasticizer is selected from the group consisting of alkyl sulfonamides and aromatic sulfonamides.

12. The ink-receptive coating composition as claimed in claim 11 wherein the plasticizer is selected from the group consisting of N-alkyl benzenesulfonamides, N-hydroxyalkyl-alkyl benzenesulfonamides, N-alkyl-o-alkyl benzenesulfonamides, N-alkyl-p-alkyl benzenesulfonamides, alkyl benzenesulfonamides, alkyl benzenesulfonamide formaldehyde resins.

13. The ink-receptive coating composition as claimed in claim 12 wherein the plasticizer is a mixture of o-toluenesulfonamide and p-toluenesulfonamide.

14. The ink-receptive coating composition as claimed in claim 1 wherein the polyamide and the plasticizer are present in a weight ratio of plasticizer to polyamide of about 20-80 parts plasticizer:100 parts polyamide.

15. The ink-receptive coating composition as claimed in claim 1 wherein the binder has a $T_g$ in the range of about −20-120° C.

16. The ink-receptive coating composition as claimed in claim 1 wherein the binder is present in a weight ratio, by solids, of about 5 to 50 parts binder:100 parts polyamide.

17. The ink-receptive coating composition as claimed in claim 1 wherein the dye-retention agent is present in a weight ratio, by solids, of about 1 to 20 parts dye-retention agent:100 parts polyamide.

18. The ink-receptive coating composition as claimed in claim 1 further comprising an ink viscosity-modifying agent.

19. The ink-receptive coating composition as claimed in claim 18 wherein the ink-viscosity modifying agent is present in a weight ratio, by solids, of about 0.1 to 20 parts ink-viscosity modifying agent:100 parts polyamide.

20. The ink-receptive coating composition as claimed in claim 1 further comprising a dispersant.

21. The ink-receptive coating composition as claimed in claim 20 wherein the dispersant is non-ionic or cationic.

22. The ink-receptive coating composition as claimed in claim 21 wherein the dispersant is at least one member selected from the group consisting of tallow trimethylammonium chloride; alkyl sulfo-betaines; alkyl polyethoxylates; and polyethoxylated alkyl phenols.

23. An ink-receptive coating composition comprising:
   (a) a polyamide, the polyamide comprising an aliphatic polyamide in particulate form, the aliphatic polyamide having a softening point in the temperature range of about 50-250° C. and an average particle size of about 1 to 80 microns;
   (b) a plasticizer, the plasticizer being a solid plasticizer selected from the group consisting of alkyl sulfonamides and aromatic sulfonamides, the solid plasticizer having a melting point in the range of about 50-200° C.;
   (c) a binder, the binder being an ethylene-vinyl acetate polymer delivered as a water-based emulsion or solution, the binder having a $T_g$ in the range of about −20-120° C.;
   (d) a dye-retention agent, the dye-retention agent comprising at least one cationic polymer;
   (e) an ink viscosity-modifying agent;
   (f) a dispersant, the dispersant being selected from the group of cationic and non-ionic dispersants;
   (g) a quantity of a water-based solvent, wherein the weight of the quantity of the water-based solvent exceeds that of the polyamide;

(h) wherein the polyamide, the plasticizer, the binder, the dye-retention agent, the ink viscosity-modifying agent and the dispersant are all present in the quantity of the water-based solvent.

24. An ink-receptive coating composition comprising:
(a) at least one polyamide in particulate form, the at least one polyamide comprising at least one copolymer of epsilon caprolactam and 12-aminododecanolactam, 6/12 polyamide or Nylon 6/12 having a softening point in the temperature range of about 100-150° C. and an average particle size of about 10 to 20 microns;
(b) a solid plasticizer, the solid plasticizer comprising a mixture of o-toluenesulfonamide and p-toluenesulfonamide, wherein the at least one polyamide and the solid plasticizer are present in a weight ratio of plasticizer to polyamide of about 40-50 parts plasticizer:100 parts polyamide;
(c) a binder, the binder comprising an emulsion of an ethylene-vinyl acetate polymer stabilized by non-ionic stabilizer, wherein the binder is present in a weight ratio, by solids, of about 10 to 20 parts binder:100 parts polyamide;
(d) a dye-retention agent, the dye-retention agent comprising an ethylene acrylic acid derivative formulated in an emulsion, wherein the dye-retention agent is present in a weight ratio, by solids, of about 1 to 20 parts dye-retention agent:100 parts polyamide;
(e) an ink viscosity-modifying agent, the ink viscosity-modifying agent comprising a polyethylene glycol polymer having a molecular weight of about 100,000 to 2,000,000 daltons, wherein the ink-viscosity modifying agent is present in a weight ratio, by solids, of about 0.1 to 20 parts ink-viscosity modifying agent:100 parts polyamide;
(f) a dispersant, the dispersant selected from the group consisting of tallow trimethylammonium chloride; alkyl sulfo-betaines; alkyl polyethoxylates; and polyethoxylated alkyl phenols;
(g) a quantity of a water-based solvent, wherein the weight of the quantity of the water-based solvent exceeds that of the at least one polyamide;
(h) wherein the at least one polyamide, the solid plasticizer, the binder, the dye-retention agent, the ink viscosity-modifying agent and the dispersant are all present in the quantity of the water-based solvent.

25. An ink-receptive coating prepared using the ink-receptive coating composition of claim 1.

26. An ink-receptive coating prepared using the ink-receptive coating composition of claim 23.

27. An ink-receptive coating prepared using the ink-receptive coating composition of claim 24.

28. The ink-receptive coating composition as claimed in claim 1 wherein the water-based solvent and the polyamide are present in a ratio of 5:3, respectively.

* * * * *